(12) United States Patent
Cooke

(10) Patent No.: US 7,980,063 B2
(45) Date of Patent: Jul. 19, 2011

(54) INSULATED REAGENT DOSING DEVICE

(75) Inventor: Michael P. Cooke, Gillingham (GB)

(73) Assignee: Delphi Technologies Holdings S.arl, Troy, MI (US)

( * ) Notice: Subject to any disclaimer, the term of this patent is extended or adjusted under 35 U.S.C. 154(b) by 1041 days.

(21) Appl. No.: 11/827,317

(22) Filed: Jul. 11, 2007

(65) Prior Publication Data

US 2008/0011780 A1 Jan. 17, 2008

(30) Foreign Application Priority Data

Jul. 12, 2006 (EP) ..................... 06253655

(51) Int. Cl.
*F01N 3/00* (2006.01)
(52) U.S. Cl. .................. 60/286; 60/301; 60/303
(58) Field of Classification Search .............. 60/286, 60/301, 303
See application file for complete search history.

(56) References Cited

U.S. PATENT DOCUMENTS

| | | | |
|---|---|---|---|
| 6,192,677 B1 * | 2/2001 | Tost | 60/286 |
| 6,430,811 B1 | 8/2002 | Ohashi | |
| 6,513,323 B1 * | 2/2003 | Weigl et al. | 60/286 |
| 6,539,708 B1 * | 4/2003 | Hofmann et al. | 60/286 |
| 7,000,381 B2 * | 2/2006 | Maisch | 60/286 |
| 7,168,241 B2 * | 1/2007 | Rudelt et al. | 60/286 |
| 7,500,356 B2 | 3/2009 | Hirata et al. | |
| 7,614,213 B2 | 11/2009 | Hirata et al. | |

FOREIGN PATENT DOCUMENTS

| | | |
|---|---|---|
| EP | 1561919 | 8/2005 |
| JP | 8-200180 | 8/1996 |
| JP | 9-228922 | 9/1997 |
| JP | 10-180043 | 7/1998 |
| JP | 10-299470 | 11/1998 |
| JP | 2002-155732 | 5/2002 |
| JP | 2005-76460 | 3/2005 |
| JP | 2005-127318 | 5/2005 |
| JP | 2005-214176 | 8/2005 |
| JP | 2006-77692 | 3/2006 |
| WO | 2004/030827 | 4/2004 |

OTHER PUBLICATIONS

Japan Office Action dated Jan. 20, 2010.

\* cited by examiner

*Primary Examiner* — Thomas E Denion
*Assistant Examiner* — Diem Tran
(74) *Attorney, Agent, or Firm* — Thomas N. Twomey

(57) ABSTRACT

A dosing device is provided that is suitable for administering a reagent into an exhaust chamber of an internal combustion engine. The device comprises a nozzle body and an insulating jacket wherein the jacket is mounted to the nozzle body at one or more mounting points, and wherein the dosing device is adapted to engage with a port located in the wall of an exhaust chamber. The insulating jacket defines a compartment, which can comprise an insulating material or can be substantially evacuated. The dosing device of the invention is advantageously insulated from the elevated temperatures in the surrounding environment, thereby allowing for the reagent to be maintained at an optimal working temperature range.

32 Claims, 3 Drawing Sheets

INSULATED REAGENT DOSING DEVICE

The present invention relates to a dosing device suitable for administering a reagent into an exhaust chamber of an internal combustion engine. In particular, the invention relates to a dosing device that is insulated from the elevated temperatures in the surrounding environment, thereby allowing the reagent to be maintained at an optimal working temperature range. The invention also relates to an exhaust system comprising such a dosing device.

Catalytic cleaning processes can be used to partially or completely remove pollutants from the exhaust gas of an internal combustion engine.

Specifically, exhaust gas cleaning may be achieved using a reducing agent that reduces one or more pollutants e.g. NOx in the exhaust gas.

In order to reduce exhaust gas emissions from an internal combustion engine, the reducing agent (e.g. urea solution) can be sprayed into an exhaust passage using a dosing device (WO2004111401). Typically, the activity of the reducing agent is triggered on contact with a catalyst downstream from the point of injection. The dosing device is mounted to the passage of an exhaust system and is exposed to the hot gases passing through the system. The reducing agent, within the dosing device, is therefore susceptible to becoming overheated, resulting in a reduced efficacy in the downstream reaction. Urea is commonly used as a reducing agent and in the case of urea in aqueous solution, crystals are known to precipitate at about 70° C. Once the reducing agent is injected, time delay between injection and reaction as the reducing agent passes down the exhaust passageway results in yet further exposure to heat.

It is highly desirable that the reducing agent remains sufficiently cool in the dosing device so that: (i) it does not crystallise or decompose in the dosing device; and (ii) downstream of the injection point the emission reduction reaction takes place with high efficacy, thereby reducing exhaust emissions.

There are a number of technologies detailed in the prior art that attempt to solve the problem identified.

One such method in DE10324482 involves circulating a portion of the reducing agent solution through the reservoir tank in order to cool the dosing device. Disadvantageously, this system requires extra plumbing and possibly the use of heat exchangers to avoid the solution in the tank from being heated. Further, a pump of larger capacity is required than is necessary for simply injection of the reducing agent.

It is described in U.S. Pat. No. 6,539,708 and WO2004030827, that in addition to the recirculation technique, a flow of cooling air or additional coolant circulation systems may be added to the injection system. Both of these systems suffer the disadvantage that a much larger consumption of power than normal is required, particularly if a large amount of heat is to be dissipated. The costs and complexity of these systems make them undesirable and more prone to failure.

A dosing device is described in EP 1561919 A1, which comprises coaxial inner and outer tubes and has a ceramic insulating material fitted between the tubes. The inner tube is supplied with a reducing agent. An end of the dosing device is located within an exhaust pipe and comprises a nozzle head. The reducing agent is sprayed into the exhaust pipe through the nozzle head. The outer tube conically narrows towards the nozzle head. This arrangement is disadvantageous because the conical narrowing of the outer tube means that the insulation of the inner tube decreases towards the nozzle head. The nozzle head itself is not insulated nor shielded by the outer tube and therefore remains exposed in the exhaust pipe to hot exhaust gases which can cause the reducing agent to overheat.

It is apparent that there is a need for a simple and cost effective way to maintain the reducing agent at an acceptable temperature whilst in the dosing device nozzle.

This invention seeks to overcome or alleviate the problems in the prior art.

According to a first aspect of the present invention, there is provided a dosing device for administering a reducing agent into an exhaust chamber of an internal combustion engine, the dosing device being adapted for mounting within a port of said exhaust chamber and comprising a nozzle body and an insulating jacket; the insulating jacket at least partially surrounding the nozzle body and defining a compartment between the insulating jacket and the nozzle body; wherein the compartment is substantially evacuated and the dosing device is configured such that, when the dosing device is mounted within the port of the exhaust chamber, the nozzle body is separated from the port by the substantially evacuated compartment.

The dosing device can take an alternative form including but not limited to a dosing injector or atomiser.

Surprisingly, in the arrangement of the invention, the reducing agent alone is sufficient to maintain the nozzle body of the dosing device, from which the agent is expelled, at an acceptable temperature during normal operation. However, it is preferred that the nozzle body of the dosing device be further insulated.

The substantially evacuated compartment serves to minimise the heat transmission directly between the jacket and the nozzle body. The compartment may be highly evacuated or contain a very low pressure gas.

In one embodiment of the invention, the insulating jacket is substantially annular in cross section. However, in other embodiments, the insulating jacket may be polygonal, or oval in cross section. The insulating jacket may enshroud the nozzle.

The insulating jacket may provide the means for engagement with the port at one or more engagement points, allowing the dosing device to be easily located within the port and maintained in a stable position. The insulating jacket may be adapted to form an interference fit within the port at the or each engagement point. The insulating jacket may include a region of enlarged diameter which is provided to form such an interference fit.

Advantageously, configuration of the jacket is such that the jacket is mounted to the nozzle body at one or more mounting points. Also advantageously, the area of physical contact between the jacket and the nozzle body at the one or more mounting points is minimal, for example advantageously in the range of between about 1 mm$^2$ and about 15 mm$^2$ total contact area, or more advantageously between about 2 mm$^2$ and about 12 mm$^2$, or even more advantageously between about 3 mm$^2$ and about 6 mm$^2$.

Likewise, the area of contact between the jacket and port at the one or more engagement points is minimal, for example, advantageously in the range of between about 1 mm$^2$ and about 50 mm$^2$ total contact area, more advantageously between about 3 mm$^2$ and about 35 mm$^2$, and even more advantageously between about 6 mm$^2$ and about 12 mm$^2$.

Further, the one or more mounting points may be remote from the one or more engagement points. The insulating jacket may be mounted to the nozzle body at first and second mounting points which are, respectively, at first and second ends of the nozzle body. The dosing device may be configured such that the or each engagement point is between the first and second mounting points, and advantageously substantially midway between the first and second mounting points One advantage of this arrangement is that it provides an extended thermal path across a small cross-sectional area along the dosing device which results in greatly reduced heat conduction from the port to the nozzle body. If the nozzle body is configured to be insulated from the exhaust system as described in the present invention, the reducing agent, inside a dosing device will not require any self re-circulation or continual circulation of extraneous coolant to maintain a working temperature and, thus, over heating during normal operation is avoided.

In certain operating conditions, for example, if the exhaust chamber is not at a sufficient temperature i.e. at a temperature substantially below 200° C., the catalyst is not at a sufficient temperature or the engine is running but a negligible amount of NOx is being generated, it is conventional to temporarily halt reducing agent dosing and air cooling may be added if necessary. When the engine is turned off, reducing agent dosing and any optional air-cooling or reagent circulation is stopped completely. Advantageously, even when the engine is switched off, the provision of effective insulation as described in the present invention, will initially minimise the heat build up in the nozzle and reduce the amount of reducing agent solution that can be over heated and precipitated.

In normal use the temperature of the nozzle body will only be maintained at an acceptable operating temperature whilst the reducing agent continues to flow through the dosing device. Once the engine is switched off and dosing is stopped, the exhaust chamber typically remains at elevated temperature for some time (up to 60 minutes). Since the exhaust chamber has a large thermal mass relative to the thermal mass of the nozzle, thermal energy will flow from the exhaust chamber to the nozzle body of the dosing device, thereby equalising the temperature in the system. In such instances, if the reducing agent solution, located at the tip of the nozzle body and exposed to the exhaust chamber, reaches boiling point, the previously described insulation further provides that the remaining solution located 'upstream' in the nozzle will remain cool. As the reducing agent solution boils and a limited quantity of urea crystals may precipitate out of the solution. However, once the engine cools or is re-started, the solution will return to the tip of the nozzle body and the urea crystals will either re-absorb in solution or be expelled from the nozzle body by pressure (when dosing resumes).

The port may be tubular and may comprise a cylindrical mounting bore within which the dosing device may be received. When in use there may be a gap extending between the outer surface of the jacket and the inner surface of the bore. Advantageously, this arrangement further serves to reduce the transmission of heat between the port and the jacket. This is beneficial because heat radiation is proportional to the fourth power of absolute temperature and therefore an apparently insignificant reduction in the temperature of the jacket will significantly reduce the amount of heat that is ultimately transmitted to and from the nozzle body.

Dependent on the engine's mode of operation, e.g. normal, temporary halt to dosing etc. the nozzle body and jacket may be heated to different temperatures at different times. The dosing device may be arranged to accommodate thermal expansion.

Conveniently, the dosing device may comprise means to allow for thermal expansion of the nozzle body and the jacket. The means may be in the form of bellows.

It is useful to have a means for dosing the reducing agent, i.e. a means to control the amount and frequency of the reducing agent to be delivered to the exhaust, whilst maintaining nozzle body temperature at an acceptable level and still allowing for thermal expansion of the nozzle body and the jacket. Such a dosing means may comprise a pump.

It is desirable that the jacket comprises an extension to accommodate the dosing means, thereby preventing the heat transmission between the exhaust and the dosing means. Such an extension may be in the form of a resilient diaphragm.

In other embodiments of the invention, the nozzle body and jacket of the dosing device may be non-linear or curved. In one embodiment of the invention, the nozzle body is substantially semi-circular. This arrangement is an efficient design as it accommodates any thermal expansion differences in the nozzle and the jacket and allows reducing agent to be directly injected into the centre of the exhaust stream.

Further, when the nozzle body and jacket are non-linear, the dosing device may further comprise a sleeve which surrounds the jacket and an insulating gap which is formed between the jacket and the sleeve. As a large surface area of the jacket is exposed directly to the heat of the gases in the exhaust, the sleeve serves to provide an additional layer of insulation around the jacket. The sleeve may be adapted to create an insulating gap between the inner surface of the sleeve and the exterior surface of the jacket. The insulating gap, provides a further layer of insulation around the jacket. It may be desirable during certain operating conditions, e.g. temporary halt in dosing for the dosing device to further comprise means for supplying a cooling fluid, for example air, to the insulating gap.

Advantageously, to support the dosing device, a mounting bracket may be utilised in combination with any of the previously described embodiments of the invention. It is desirable that the mounting bracket has a first means for connecting to any point on the exhaust and a second means for connecting to the dosing device (or the pump).

Typically, the first and second connecting means will be positioned at opposing ends of the bracket.

It is further desirable that the mounting bracket is able to support the weight of the dosing means.

The bracket may be made of a material with low efficiency conductive properties, for example, a metal with a conductivity value of between approximately 7 W/mK and approximately 22 W/mK, in order that heat conduction from the exhaust to the dosing device via the bracket is reduced. Suitably, stainless steel is used as the low conductivity metal, having a conductivity value of 14 W/mK.

The second connecting means may be attached at localised areas to the dosing means or the dosing device. The second connecting means may comprise a spider washer.

As the exhaust stream can reach temperatures of up to several hundred degrees Celsius (450° C. or more), the transmission of heat to the nozzle by radiation can also be significant. Advantageously, in keeping with any of the previous embodiments of the invention, to reduce heat transmission between the port and the nozzle body, the nozzle body and/or the port can additionally be polished and/or coated with a material of low-emissivity. The material of low emissivity may be selected from gold, silver, aluminium, nickel, chrome, zinc and tungsten.

In keeping with all previously disclosed embodiments, the jacket may be made of an inefficient heat conducting metal, for example stainless steel or a or metal with a conductivity value in the range of 7.8 to 22 W/mK.

According to a second aspect of the invention, there is provided a dosing device for administering a reducing agent into an exhaust chamber of an internal combustion engine; the dosing device comprising a nozzle body and an insulating jacket; the nozzle body having a first portion extending into the exhaust chamber in use, and a second portion located externally to the exhaust chamber in use; the first portion of the nozzle body comprising an outlet end at which the reducing agent is expelled from the dosing device into the exhaust chamber; wherein the insulating jacket surrounds the first and second portions of the nozzle body, and is of substantially uniform diameter along the length of the first portion of the nozzle body.

The insulating jacket may be substantially annular in cross section and define a compartment between the insulating jacket and the nozzle body. The compartment may comprises an insulating material. The insulating material may comprise a solid, such as a ceramic; an insulating powder e.g. a metal oxide such as magnesium oxide or fumed silica; a fibre, e.g. glass or mineral wool; or a gas, e.g. nitrogen, xenon or krypton. Alternatively, the compartment may be substantially evacuated.

According to a third aspect of the present invention, there is provided a dosing device, suitable for administering a reducing agent into an exhaust chamber, comprising a nozzle body and an insulating jacket wherein the jacket is mounted to the nozzle body at one or more mounting points, and wherein the dosing device is adapted to engage with a port of an exhaust system of an internal combustion engine.

Conveniently, the jacket is configured to enclose a compartment which resides between the jacket and the nozzle body of the dosing device. The compartment is substantially annular in cross section. The compartment optionally comprises an insulating material or is substantially evacuated (i.e. to render the compartment a vacuum or at least comprising a very low pressure gas). The compartment and insulating material/vacuum help minimise heat transmission occurring directly between the jacket and the nozzle body.

The insulating material may comprise a solid, such as a ceramic; an insulating powder e.g. a metal oxide such as magnesium oxide or fumed silica; a fibre, e.g. glass or mineral wool; or a gas, e.g. nitrogen, xenon or krypton.

As mentioned, the compartment may contain a vacuum as this also provides a highly effective means of insulation.

The inventive concept extends to an exhaust chamber for an internal combustion engine comprising a dosing device as described above.

It will be appreciated that optional features described above relating to the dosing device of the first aspect of the invention are equally applicable to the dosing device of the second or third aspects of the invention.

The inventive concept extends to a vehicle having an exhaust system comprising a dosing device as described above.

According to a fourth aspect of the present invention, there is provided an exhaust system of an internal combustion engine, the exhaust system comprising: an exhaust chamber having a tubular port defining a bore; and a dosing device received within the bore and arranged to administer a reducing agent into the exhaust chamber; the dosing device having a nozzle body and an insulating jacket; the insulating jacket at least partially surrounding the nozzle body; and the insulating jacket defining a compartment between the insulating jacket and the nozzle body; wherein the compartment is substantially evacuated and separates the nozzle body from the tubular port.

The insulating jacket may be adapted to engage with the port at an engagement point. The insulating jacket may form an interference fit within the bore at the engagement point. The insulating jacket may be mounted to the nozzle body at first and second mounting points which are each remote from the engagement point. The engagement point may be between the first and second mounting points. Advantageously, the engagement point may be substantially midway between the first and second mounting points.

It is desirable that the exterior surface of the jacket is cooled. Therefore, the dosing device may also include a means for channeling a cooling fluid over the surface of the jacket. The insulating jacket and the port may be spaced apart such that a gap is defined between the exterior surface of the jacket and the port. One or more inlet passages may be provided to communicate a volume of cooling fluid, such as a gas, between the jacket and the port, thereby to cool the exterior surface of the jacket. The cooling fluid may be air which can conveniently be taken from any point, such as air passing through the engine, and in particular from air inlet passages downstream of a turbocharger compressor wheel in the engine.

The tubular port may comprise a first portion and a second portion. The first portion may extend into the exhaust passage. The second portion may be located externally to the exhaust passage. For example, the second portion may protrude from the exhaust passage. The nozzle body may also have a first portion that extends into the exhaust chamber. The first portion of the tubular port may surround the first portion of the nozzle body, thereby shielding the first part of the nozzle body from hot exhaust gases in the exhaust chamber.

It will be appreciated that the inventive concept encompasses a vehicle having an exhaust system as described above.

Although optional features of the invention may be described above in relation to a particular aspect or embodiment of the invention, it should be appreciated that many of these optional features are interchangeable between the various aspects and embodiments. In particular, it will be appreciated that the optional features of the dosing device of the first aspect of the invention are applicable to the dosing device of the exhaust system of the fourth aspect of the invention. Conversely, optional features of the fourth aspect of the invention are applicable to the first aspect of the invention.

Preferred embodiments of the present invention will now be described, by way of example only, with reference to the drawings, in which.

Figure 1:
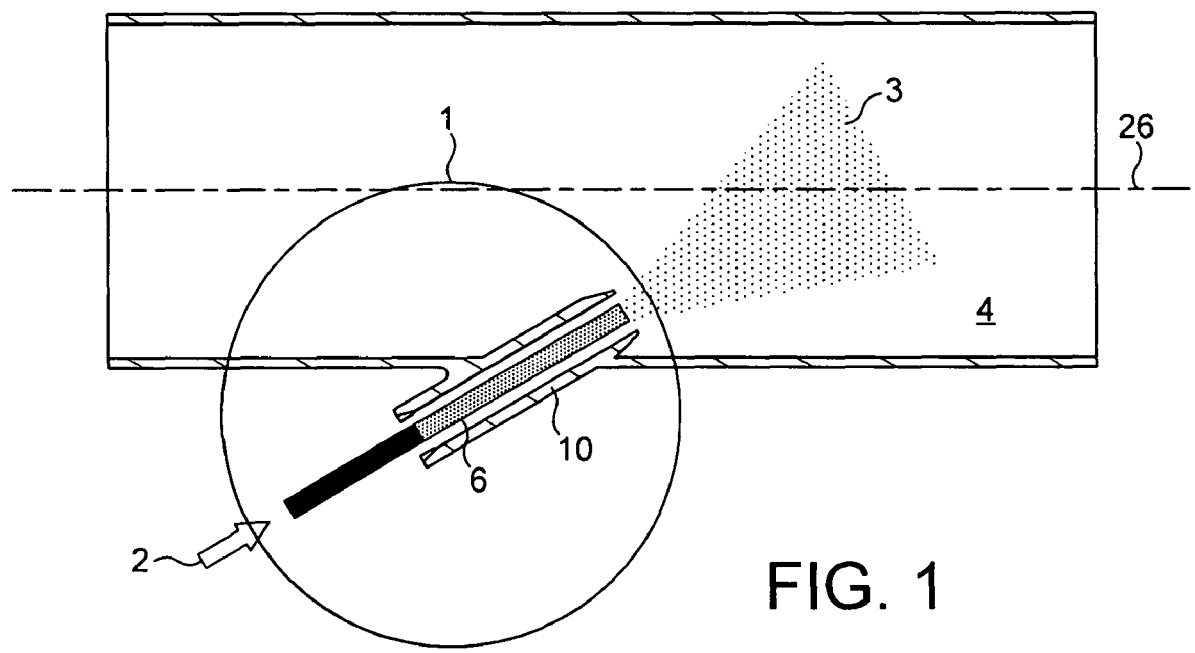
FIG. 1 is a cross-sectional view of a dosing device received within a port of an exhaust passage.

Referring to FIG. 1 of the accompanying drawings, there is provided an elongate dosing device 1 mounted within a tubular port 10 of an exhaust passage 4 of an internal combustion engine. The dosing device 1 comprises a nozzle body 6 defining an injection bore 24 (FIG. 2) which is supplied with a solution of a reducing agent 2. During operation, the dosing device 1 provides a spray 3 of the reducing agent 2 into the exhaust passage 4.

Figure 2:
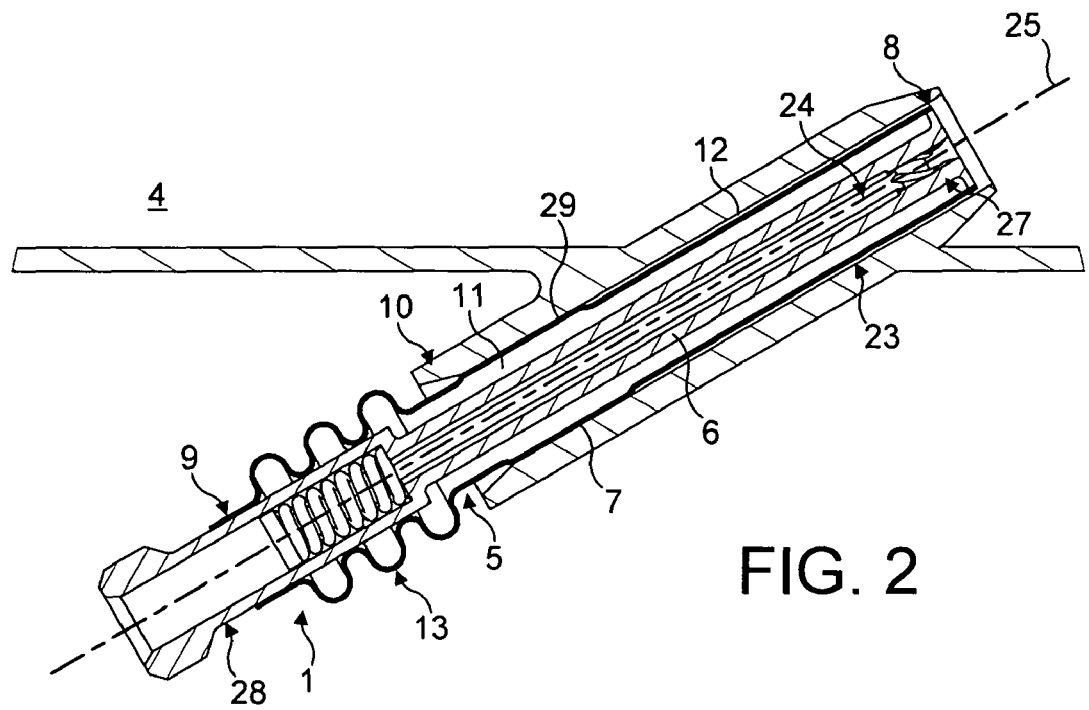
FIG. 2 is a cross-sectional view of a dosing device according to a first embodiment of the invention received within the port of the exhaust chamber of FIG. 1.

Referring to FIG. 2, the tubular port 10 protrudes from, and partially extends into, the exhaust passage 4. The tubular port 10 defines a cylindrical mounting bore 23, within which, part of the dosing device 1 is received. The tubular port 10 is inclined relative to the exhaust passage 4, such that the longitudinal axis 25 of the port 10/cylindrical mounting bore 23 is transverse to, and approximately 45 degrees to, the longitudinal axis 26 (FIG. 1) of the exhaust passage 4.

Hot exhaust gases in the exhaust passage 4 cause the walls of the exhaust passage 4, including the tubular port 10, to become hot. The dosing device 1 is configured such that heat transfer from the hot exhaust gases and/or from the tubular port 10, to the nozzle body 6, is minimised. This serves to minimise heating of the reducing agent 2.

The nozzle body 6 is elongate and comprises a first end 27 and a second end 28. The first end 27 is also referred to as an outlet end 27 because it comprises outlets from which the reducing agent 2 is sprayed. The second end 28 is also referred to as an inlet end 27 because it comprises an inlet for the reducing agent 2. The first end 27 extends into the exhaust passage 4, and is surrounded by the tubular port 10. The tubular port 10 shields the first end 27, thereby protecting this end of the nozzle body 6 from the exhaust gases in the exhaust passage 4. The second end 28 is located outside the tubular port 10 and remote from the exhaust passage 4.

The nozzle body 6 is surrounded, along the majority of its length, by an elongate insulating jacket 5. The insulating jacket 5 has thin walls and is made of an insulating material, for example a low conductivity metal such as stainless steel. The insulating jacket 5 is located between the nozzle body 6 and the port 10 and prevents direct contact between the port 10 and the nozzle body 6. By separating the nozzle body 6 and the port 10, the jacket 5 insulates the nozzle body 6 from the port 10, and from the hot exhaust gases in the exhaust passage 4.

The jacket 5 is substantially annular in cross section and comprises a mounting portion 29 of increased diameter. The mounting portion 29 defines an engagement point 7 at a position along the length of the insulating jacket 5 at which the insulating jacket 5 forms an interference fit with the port 10, thereby serving to mount the dosing device 1 within the port 10. An air gap or space 12 is defined between the jacket 5 and the tubular port 10, such that the jacket 5 is only in direct contact with the tubular port 10 at the engagement point 7. This arrangement serves to minimise the contact area between tubular port 10 and the jacket 5, and thereby reduces the transmission of heat from the tubular port 10 to the jacket 5.

A reduction in temperature of the jacket 5 is advantageous because it significantly reduces transmission of heat to the nozzle body 6 by radiation. This is because heat transmission by radiation is proportional to the fourth power of absolute temperature.

The jacket 5 is mounted to the nozzle body 6 at mounting points 8 and 9 which are, respectively, towards the first and second ends 27, 28 respectively, of the nozzle body 6. A compartment 11 is defined between the nozzle body 6 and the jacket 5 in a region between the mounting points 8 and 9. The compartment 11 is substantially annular in cross section and separates the jacket 5 and the nozzle body 6 within the port 10, thereby serving to reduce transmission of heat by radiation from the jacket 5 to the nozzle body 6.

The engagement point 7 between the jacket 5 and the tubular port 10 is remote from the mounting points 8 and 9 of the jacket 5 to the nozzle body 6. In this example the engagement point 7 is between, and approximately mid-way between, the mounting points 8 and 9. For heat to conduct from the tubular port 10 to the nozzle body 6, it must travel along the length of the jacket 5, from the engagement point 7, and towards the respective mounting points 8 and 9. This arrangement provides an extended thermal path between the tubular port 10 and the nozzle body 6 because the engagement point 7 is remote from both of the mounting points 8 and 9.

The extended thermal path described above has a small cross-sectional area because the jacket 5 is thin. This extended thermal path of small cross-sectional area serves to dissipate heat over the jacket 5, thereby minimising the conduction of heat from the tubular port 10 to the nozzle body 6. Therefore, even when the tubular port 10 is elevated to a high temperature there is minimal thermal conduction from the tubular port 10 to the nozzle body 6.

The compartment 1, which is defined between the jacket 5 and the nozzle body 6, is substantially evacuated. The vacuum may be created by welding the jacket 5 to the nozzle body 6 at the mounting points 8 and 9, inside an evacuated chamber, e.g. by using a laser. A hermetic seal is formed at the mounting points 8 and 9, and hence a major portion of the nozzle body 6 is hermetically sealed within the jacket 5. The evacuated compartment 11 serves to minimise the transmission of heat from the insulating jacket 5 to the nozzle body 6.

The nozzle body 6 is separated from the tubular port 10 by the insulating jacket 5 and by the evacuated compartment 11, along the length of the tubular port 10. Further, the jacket is separated from the tubular port 10 by the gap 12, apart from at the engagement point 7. However, the nozzle body 6 is separated from the tubular port 10 at the engagement point 7 by the evacuated compartment 11, which is of particular importance for reducing thermal transmission to the nozzle body 6.

Since during normal operation the nozzle body 6 and jacket 5 will often be at different temperatures, the dosing device 1 further comprises means 13 to allow for their thermal expansion, this means is in the form of bellows 13.

The outer surface of the nozzle body 6 and/or the port 10 may be polished and/or coated with a material of low emissivity, e.g. gold, silver or aluminium. As the exhaust chamber 4 can reach temperatures of several hundred degrees Celsius, for example 450° C. (approximately 850° F.) or more, this coating will further assist in minimising the transmission of heat to the nozzle body 6 by radiation.

Although the compartment 11 is evacuated in the embodiment described above, it will be appreciated that in other embodiments, instead of containing a vacuum, the compartment 11 may be filled with an insulating material such as a ceramic, powder, fibre or gas. Such insulating materials serve to minimise the transmission of heat from the jacket 5 to the nozzle body 6.

Figure 3:
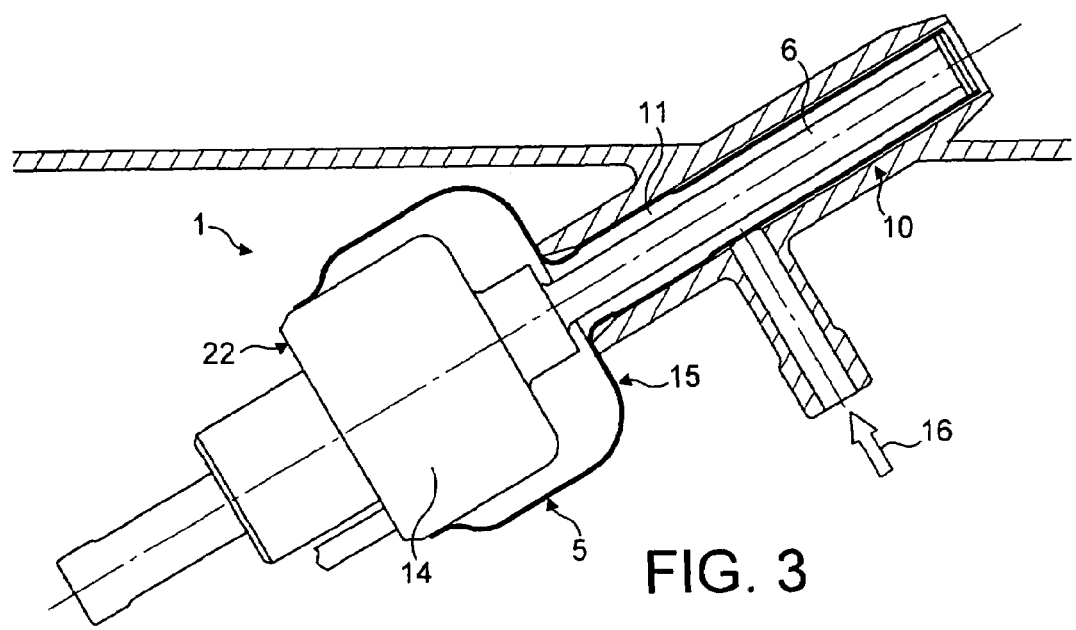
FIG. 3 is a cross-sectional view of a dosing device according to a second embodiment of the invention.

Referring now to FIG. 3, there is provided a dosing device 1 comprising a pump 14 for effective dosing of the reducing agent solution (not shown). The insulating jacket 5 is extended to further cover the pump 14 and reduce heat transmission from the port 10 to the pump 14 and hence the reducing agent 2. The pump 14 has a larger outer surface 22 than the nozzle body 6, the jacket 5 is conveniently formed as a resilient diaphragm 15 around the pump 14. A means for providing a flow of air 16 to the jacket 5 is included to cool the jacket 5. This air 16 may be conveniently drawn from any point in the air inlet passages of the internal combustion engine (not shown) or specifically from down stream of a turbocharger compressor wheel (not shown).

Figure 4:
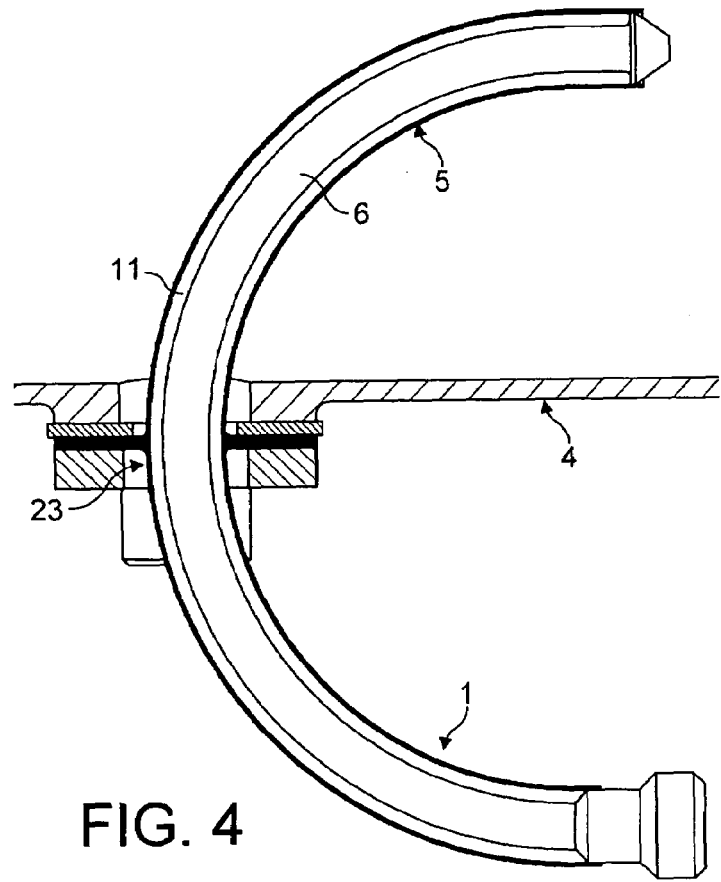
FIG. 4 is a cross-sectional view of a dosing device according to a third embodiment of the invention.

Referring to FIG. 4, there is provided a dosing device 1 having a nozzle body 6 and an insulating jacket 5 both in a semi-circular arrangement. The dosing device 1 is positioned in the mounting bore 23 of the port 10 of the exhaust chamber passage 4. The curved shape of the dosing device 1 and nozzle body 6 enables the reducing agent (not shown) to be injected centrally into the exhaust chamber passage 4.

Figure 5:
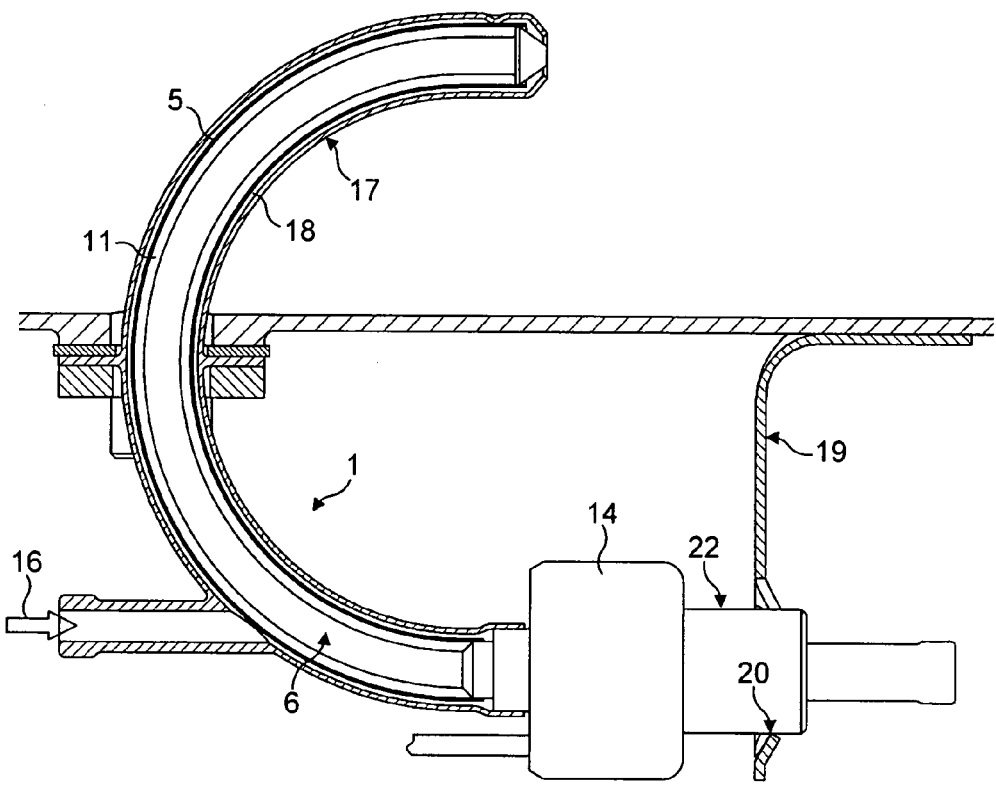
FIG. 5 is a cross-sectional view of a dosing device according to a fourth embodiment of the invention.

Referring to FIG. 5, there is provided a dosing device 1 as described above with reference to FIG. 4 further comprising a sleeve 17 which surrounds the jacket 5 forming an insulating gap 18 between the jacket 5 and the sleeve 17. Both the sleeve 17 and the gap 18 provide additional insulation around the jacket 5. As a result, heat transmission from the exhaust chamber 4 to the large surface area of the jacket 5 is dramatically decreased. A means 16 for supplying cooling air to the insulating gap 18 is provided. A pump 14, which has a outer surface 22, regulates the dosing of the reducing agent. To provide extra support to the dosing device 1, a mounting bracket 19, which may be made from stainless steel, is affixed to the exhaust chamber 4 by a first connecting means. The mounting bracket 19 is also affixed to the dosing device 1 or the pump 14 and by a second connecting means at localised points 20 around the outer surface 22 of the pump 14. Localised contact between the bracket 19 and the pump 14 limits the heat conduction and therefore reduces the transmission of heat to the nozzle body 6.

Figure 6:
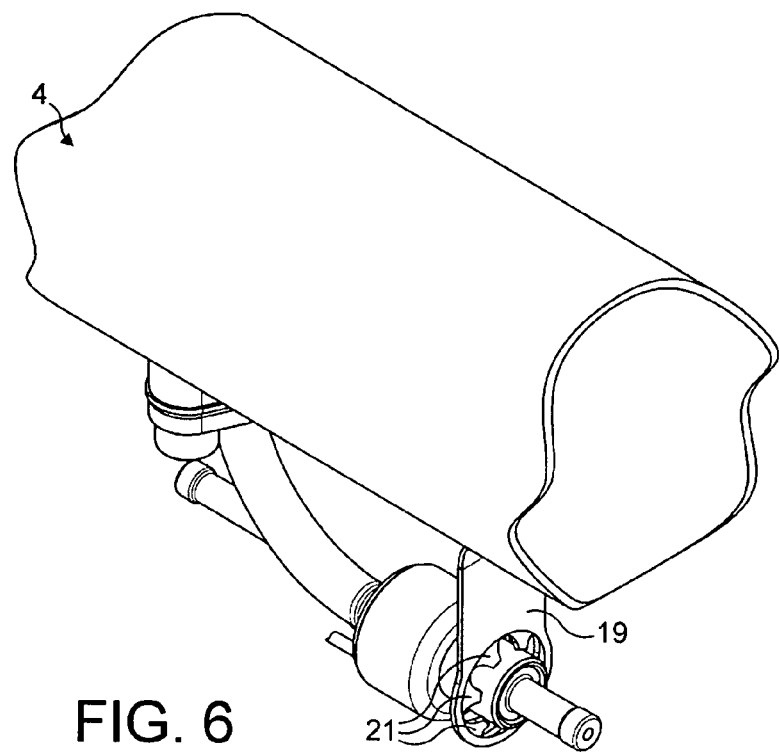
FIG. 6 is a perspective view of the dosing device of FIG. 5.

Referring to FIG. 6, there is provided a dosing device 1, as described above with reference to FIG. 5, having a bracket 19 with a second connecting means 21, more preferably a spider 21 optionally in the form of a star washer. The second connecting means 21 is connected to the outer surface 22 (FIG. 5) of the pump 14, for example, by being pushed over the outer surface 22 of the pump 14 during assembly, so that there is limited contact between the pump 14 and the bracket 19.

It will be appreciated that preferred, and/or optional features of the various embodiments or aspects of the invention described herein may be interchanged without departing from the scope of the invention as defined in the following claims.

The invention claimed is:

1. A dosing device for administering a reducing agent into an exhaust chamber of an internal combustion engine, the dosing device being adapted for mounting within a port of said exhaust chamber and comprising a nozzle body and an insulating jacket;
    the insulating jacket at least partially surrounding the nozzle body and defining a compartment between the insulating jacket and the nozzle body;
    wherein the compartment is substantially evacuated and the dosing device is configured such that, when the dosing device is mounted within the port of the exhaust chamber, the nozzle body is separated from the port by the substantially evacuated compartment;
    wherein the insulating jacket is mounted to the nozzle body at one or more mounting points and the insulating jacket is adapted to engage with the port at an engagement point that is remote from the or each mounting point
    wherein the insulating jacket is adapted to form an interference fit within the port at the engagement point.

2. A dosing device according to claim 1, wherein the insulating jacket includes a mounting region of enlarged diameter, the mounting region defining the engagement point and being provided to form the interference fit.

3. A dosing device according to claim 1, further comprising a mounting bracket.

4. A dosing device according to claim 1, wherein the nozzle body and/or the port are polished or coated with a material of low emissivity.

5. A dosing device according to claim 1, wherein the jacket comprises a material having properties of low thermal conduction efficiency.

6. A vehicle having an exhaust system comprising a dosing device according to claim 1.

7. A dosing device according to claim 1, wherein the nozzle body has a first end and a second end, the first end comprising a first mounting point and the second end comprising a second mounting point, and the insulating jacket being mounted to the nozzle body at the first and second mounting points.

8. A dosing device according to claim 7, wherein the dosing device is configured such that the engagement point is located at a position along the length of the jacket that is between the first and second mounting points.

9. A dosing device according to claim 8, wherein the engagement point is substantially midway between the first and second mounting points.

10. A dosing device according to claim 1, wherein the dosing device is adapted for mounting within a substantially cylindrical bore defined in the port.

11. A dosing device according to claim 10, wherein a portion of the insulating jacket is of smaller diameter than the diameter of the bore, such that when the dosing device is received within the bore, a gap is defined between the insulating jacket and the bore.

12. A dosing device according to claim 11, wherein the gap is substantially annular in cross-section.

13. A dosing device according to claim 1, wherein the insulating jacket is adapted to accommodate thermal expansion of the nozzle body and the insulating jacket.

14. A dosing device according to claim 13, wherein the insulating jacket includes bellows to accommodate the thermal expansion of the nozzle body and the insulating jacket.

15. A dosing device (1) according to claim 14, further comprising a pump assembly (14) for regulating the dosing of the reducing agent.

16. A dosing device according to claim 15, wherein the jacket comprises an extended portion for accommodating the pump assembly.

17. A dosing device according to claim 16, wherein the extended portion of the jacket comprises a resilient diaphragm.

18. A dosing device according to claim 1, wherein the nozzle body and jacket are in a non-linear configuration.

19. A dosing device according to claim 18, wherein the nozzle body and jacket are curved.

20. A dosing device according to claim 19, wherein the nozzle body and jacket are substantially semi-circular.

21. A dosing device for administering a reducing agent into an exhaust chamber of an internal combustion engine, the dosing device being adapted for mounting within a port of said exhaust chamber and comprising a nozzle body and an insulating jacket;
    the insulating jacket at least partially surrounding the nozzle body and defining a compartment between the insulating jacket and the nozzle body;
    wherein the compartment is substantially evacuated and the dosing device is configured such that, when the dosing device is mounted within the port of the exhaust chamber, the nozzle body is separated from the port by the substantially evacuated compartment,
    the dosing device further comprising a sleeve which surrounds the jacket and defines an insulating gap between the jacket and the sleeve.

22. A dosing device according to claim 21, further comprising an air supply to the insulating gap.

23. An exhaust system of an internal combustion engine, the exhaust system comprising:
    an exhaust chamber having a tubular port defining a bore; and
    a dosing device received within the bore and arranged to administer a reducing agent into the exhaust chamber; the dosing device having a nozzle body and an insulating jacket; the insulating jacket at least partially surrounding the nozzle body; and the insulating jacket defining a compartment between the insulating jacket and the nozzle body;

wherein the compartment is substantially evacuated and separates the nozzle body from the tubular port;

wherein the insulating jacket is adapted to engage with the port at an engagement point;

wherein the insulating jacket forms an interference fit within the bore at the engagement point.

24. A vehicle having an exhaust system according to claim 23.

25. An exhaust system according to claim 23, the nozzle body defining first and second mounting points which are each remote from the engagement point; and the insulating jacket being mounted to the nozzle body at the respective first and second mounting points.

26. An exhaust system according to claim 25, wherein the engagement point is located at a position along the length of the insulating jacket that is between the first and second mounting points.

27. An exhaust system according to claim 26, wherein the engagement point is substantially midway between the first and second mounting points.

28. An exhaust system of an internal combustion engine, the exhaust system comprising:

an exhaust chamber having a tubular port defining a bore; and a dosing device received within the bore and arranged to administer a reducing agent into the exhaust chamber; the dosing device having a nozzle body and an insulating jacket; the insulating jacket at least partially surrounding the nozzle body; and the insulating jacket defining a compartment between the insulating jacket and the nozzle body;

wherein the compartment is substantially evacuated and separates the nozzle body from the tubular port, wherein a gap is defined between the tubular port and the insulating jacket.

29. An exhaust system according to claim 28, further comprising one or more inlet passages to allow for fluid communication between the gap and a source of cooling fluid.

30. An exhaust system according to claim 29, wherein the fluid is a gas.

31. An exhaust system according to claim 30, wherein the gas is air.

32. An exhaust system according to claim 29, wherein the one or more inlet passages are in communication with a passage downstream of a turbocharger compressor wheel.

* * * * *